United States Patent [19]

Tucker et al.

[11] Patent Number: 4,507,777

[45] Date of Patent: Mar. 26, 1985

[54] PROTOCOL FOR DETERMINING PHYSICAL ORDER OF ACTIVE STATIONS ON A TOKEN RING

[75] Inventors: Edwin L. Tucker, Raleigh; Richard H. Waller, III, Chapel Hill; Kenneth T. Wilson, Raleigh, all of N.C.

[73] Assignee: International Business Machines Corporation, Armonk, N.J.

[21] Appl. No.: 463,470

[22] Filed: Feb. 3, 1983

[51] Int. Cl.³ .......................... H04J 1/16; H04J 3/14; H04J 3/00

[52] U.S. Cl. ....................................... 370/16; 370/86; 340/825.05

[58] Field of Search ...................... 370/86, 89, 90, 16; 340/825.05

[56] References Cited

U.S. PATENT DOCUMENTS

| | | | |
|---|---|---|---|
| 3,564,145 | 2/1971 | Deutch et al. | 370/16 |
| 3,824,545 | 7/1974 | Brenner et al. | 370/90 |
| 3,985,962 | 10/1976 | Jones et al. | 370/90 |
| 4,000,378 | 12/1976 | Caplan | 370/90 |
| 4,034,351 | 7/1977 | Takezoe | 370/90 |
| 4,161,635 | 7/1979 | Wolaver | 370/90 |
| 4,335,426 | 6/1982 | Maxwell et al. | 370/86 |
| 4,410,985 | 10/1983 | Yasumoto et al. | 340/825.05 |

Primary Examiner—Douglas W. Olms
Assistant Examiner—Kenneth I. Rokoff
Attorney, Agent, or Firm—Joscelyn G. Cockburn

[57] ABSTRACT

A reconfigurable serial loop or ring communication system is provided with a method and apparatus which enables stations on the loop to ascertain the address of its nearest active upstream neighbor (NAUN). A Ring Poll Frame is generated and broadcast from an originating station. The Ring Poll Frame includes a Ring Poll command, a From Address and a reset Address Recognized (AR) control bit. The first active downstream station recognizes the command with the control bit in the reset state, copies the contents of the ring poll frame and sets the bit. The set bit inhibits subsequent downstream stations from copying the frame. The first active station then generates a substantially similar formatted ring poll frame and passes it downstream. The process is continued by downstream active stations until the originating station receives a ring poll frame having a reset control bit. The reset control bit is an indication that all stations on the loop know the address of its NAUN.

A ring management station may use the ring poll process to acquire information relative to the location of active stations on the ring.

11 Claims, 11 Drawing Figures

PROTOCOL FOR DETERMINING PHYSICAL ORDER OF ACTIVE STATIONS ON A TOKEN RING

BACKGROUND OF THE INVENTION

1. Field of the Invention

The invention relates to ring or serial loop data communication systems and, more particularly, to method and apparatus for acquiring information relative to the ordering and for the precise location of active stations on the ring. The information may be used to correct a fault should one occur on the ring.

2. Prior Art

The use of serial or ring communication systems for transferring data is well known in the prior art. Such systems include a ring transmission medium to which a plurality of stations are connected. Access to the ring is controlled by a set of protocols which ensures that each station is given an opportunity to transmit and/or receive data from the ring.

Prior art ring communication systems may be classified into two groups, the centralized systems ad the decentralized systems. In the centralized systems, the ring is controlled from a centralized station. U.S. Pat. No. 3,564,145 describes a serial loop data transmission system having a central station with a computer (central control unit) for controlling the loop. Because most of the control or supervisory functions are handled through a single station, the overhead traffic between terminal stations and the central station is relatively high. This in turn may reduce the amount of useful data which is transmitted on the ring.

In the decentralized system the control or supervisory functions are distributed to the stations on the ring. Oftentimes a monitor station may provide functions such as clocking, generating frame headers, error checking and recovery, etc., but does not have central control. Such a decentralized system appears to be very attractive in that the communication link can support a relatively large number of stations or nodes with maximum data throughput. Moreover, the stations can be inserted and removed from the ring during normal ring operation.

As with any type of electromechanical device, the above communication systems are susceptible to fault or breakdown. The faults may occur in the communication link and/or at the nodes. Such faults often interrupt data transmission. The prior art describes several techniques for locating, reporting and correcting faults. For example, U.S. Pat. No. 3,564,145 describes a fault-locating device. However, before the fault-locating device can be utilized, the location and/or ordering of the stations on the loop must be known. The location and/or ordering information can be used to isolate error causing nodes and a break in the loop. Station location is of particular importance in a mobile and reconfigurable system where stations are added and removed, at will, from the communication link. In such systems once the fault is isolated the ring can be reconfigured and used for data transmission.

SUMMARY OF THE INVENTION

It is therefore a main object of the present invention to provide a novel method for determining the identity of the active stations on a ring communication system.

It is another object of the present invention to provide a procedure which enables the stations on the ring communication system to ascertain the identity of its next active upstream station or next active upstream node (NAUN).

It is still another object of the present invention to report the identity of each active station to a control station.

It is yet another object of the present invention to report a change in the NAUN to a control station.

The method utilizes a special formatted frame to pass its identity (ring station address and its physical address) to the next active downstream station. That station saves the identity of the passing station and utilizes a similar special formatted frame to pass its own identification to the next active downstream station.

A station designated as a "Poll Originator" periodically issues a "Ring Poll Request" frame. The frame includes a Roll Call Poll Command, a From Address and a reset Address Recognized (AR) bit. The first active downstream station recognizes the command and the reset bit; sets the bit and copies the message. The frame identifies the next active upstream station, sometimes called the next active upstream node (NAUN). At the next opportunity the station transmits a frame with the Ring Poll Response command, with its own address in the "From Address Field" and resets the AR bit. When the frame is received by the next downstream station, it is processed in a similar way by the station. The process is repeated until the "Poll Originator" receives a frame in which the AR bit is in the reset state.

In an alternative embodiment of the invention, the frame includes control fields which indicate to each station that it should report the identity of its NAUN to a management node.

The foregoing and other features and advantages of the invention will be more fully described in the accompanying drawings.

BRIEF DESCRIPTION OF THE DRAWINGS

FIGS. 2-5 show the basic frame format for the Ring Poll Process according to the present invention. The frame carries a message which alerts stations to copy the identity of its next active upstream station and optionally to report its identity to a management function.

DESCRIPTION OF THE PREFERRED EMBODIMENT

Figure 1:
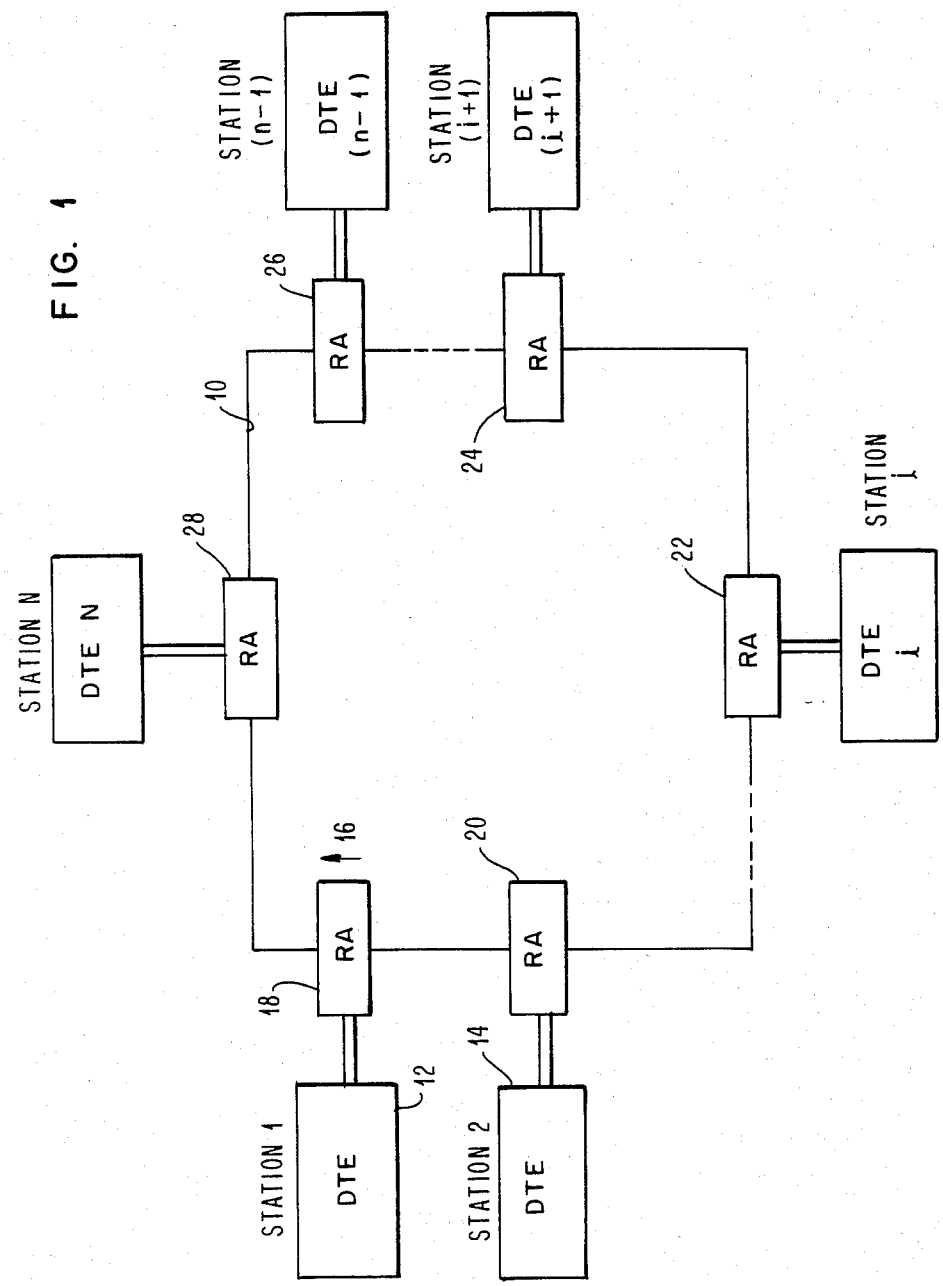
FIG. 1 is a block diagram of a ring communication system in which the present invention may be used.

FIG. 1 shows a serial loop communications system in which the novel station identification system of the present invention may be employed. The serial ring communications system includes a closed loop unidirectional transmission ring identified by numeral 10. The ring interconnects a plurality of data terminal equipment (DTE) or data terminal units (DTU) 12, 14, . . . i, i+1, . . . n−1 and n. Each data terminal unit may include one or several devices such as display terminals, microcomputers, data collectors and telephone-type apparatus. The function of the system is to exchange or distribute data between these devices. Data transmission in the system is unidirectional and may be in the direction shown by arrow 16. The data terminal equipment is connected to the ring by ring adapter 18, 20, 22, 24, 26 and 28 respectively. The structure and function of the ring adapters are identical. Their purpose is to receive data from and transmit data onto the ring. To this end the ring adapter performs ring protocol functions which enable the free movement of data on the ring without impacting the design of the data terminal equipment. A detailed description of the ring adapter will follow hereinafter. Suffice it to say at this point that the ring adapter protocol includes the so-called "ring poll process protocol" which enables the identity of all stations and/or data terminal equipment on the ring to be known.

Once the identity of the stations and/or data terminal equipment is known, if a fault occurs on the ring which requires sending of a beacon message, the addresses of the stations suspected of creating the fault are included in the message. A station upon receiving the beacon message with its address can execute recovery procedures. These procedures may include a bypass routine which would correct for a break in the ring between the device issuing the beacon frame and the next upstream station. Other steps may also be taken initially.

In any event, a defect, be it a break in the ring or a defect in the data terminal equipment, will not totally paralyze the ring from transmitting data. In other words, the ring is reconfigurable using one of the well-known bypass techniques. These techniques do not form part of the present invention. Therefore, they will not be described any further. By way of example, U.S. Pat. No. 3,564,145 describes one technique for locating and/or bypassing defects.

Still referring to FIG. 1, data terminal equipment is connected to a ring adapter. As stated before, data to and from the data terminal equipment is presented and extracted from the ring by the ring adapter. The ring adapter and its connected data terminal equipment are hereinafter referred to as a station. For example, station 1 includes data terminal equipment 12 and ring attachment 18. Likewise, station 2 includes data terminal equipment 14 and ring adapter 20, and so on. In addition to being reconfigurable, the communication system of FIG. 1 is mobile. The system may be mobile in that any of the data terminal equipment can be connected to any of the ring adapters. A more detailed description of the serial data communication system of FIG. 1 for illustrating the environment in which the invention may be practiced can be found in a copending patent application filed by P. A. Janson et al titled, "Method of Transmitting Information Between Stations Attached to a Unidirectional Transmission Ring," Ser. No. 06/326,291 and assigned to the same assignee as this application. This application is incorporated herein by reference.

Figure 6:
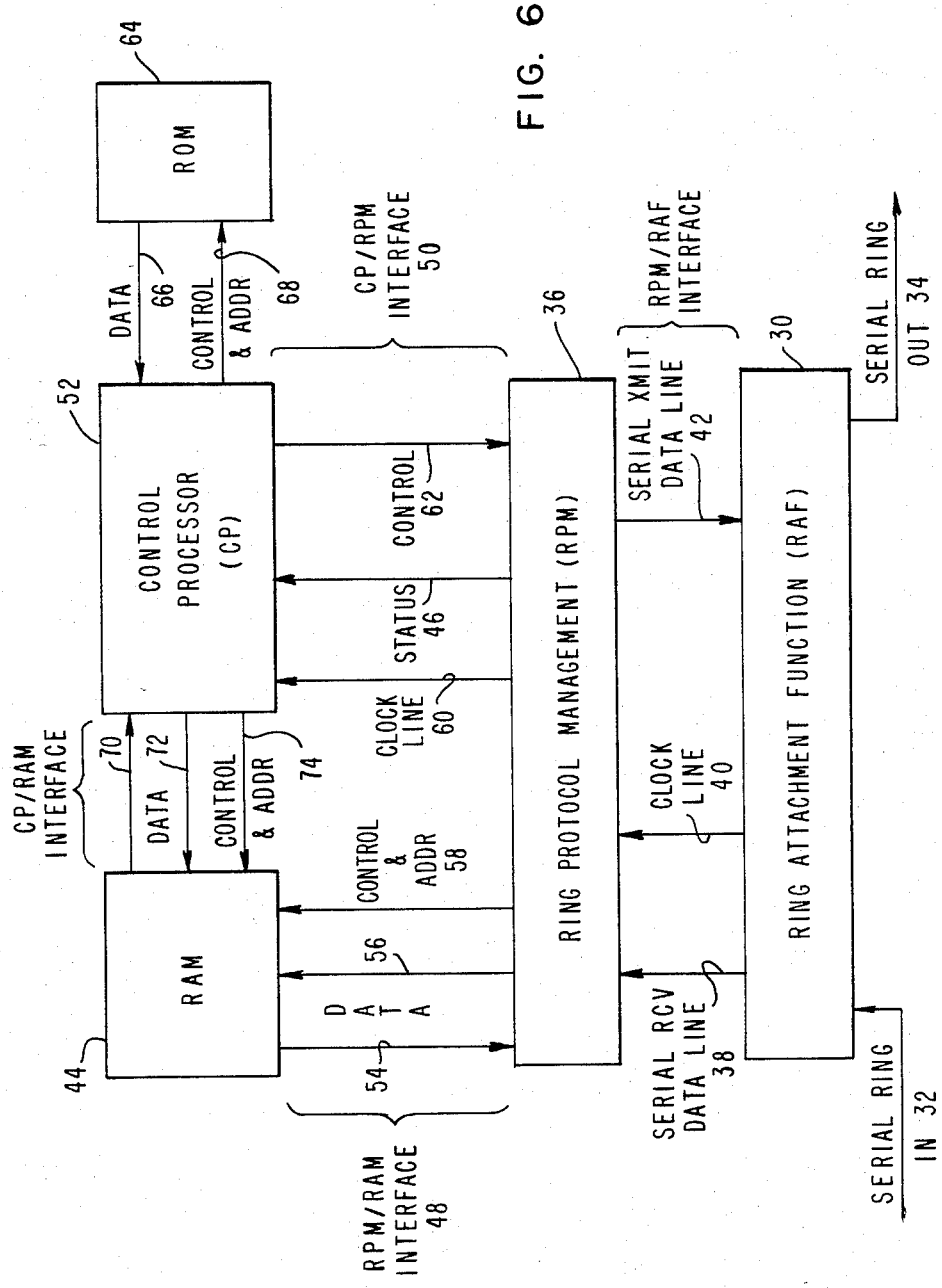
FIG. 6 is a functional block diagram of a microprocessor controlled ring adapter which processes the message of FIGS. 2-5.

FIG. 6 shows a functional block diagram of the ring adapter. As stated before, the ring adapter allows a station to accept and dispatch data on the communication link of FIG. 1. The ring adapter (FIG. 6) includes a front end section hereinafter called ring attachment function (RAF) means 30. The ring attachment function is a grouping of electronic circuitry which performs electrical signal conversion on data which is slated for transmission onto the ring and on data which is received from the ring. Such signal conversion may include modulation and demodulation. Data into RAF 30 is supplied on serial ring in line 32. Serial ring in line 32 may be twisted pair conductors, fiber optics link, etc. Similarly, data to be inserted on the ring is transmitted on serial ring-out line 34. The serial ring-out line 34 may be the same type of conductor as serial ring in line 32. Additionally, the ring attachment function means 30 extracts timing signal from the serial ring data and uses the timing signal for synchronizing the data onto the serial ring-out line 34 and into the ring protocol management (RPM) means 36. The RAF also includes the transmitters and receivers which transmit and receive information from the communication ring.

The ring attachment function means 30 is coupled to the ring protocol management means 36 by the ring protocol management/ring attachment function (RPM/RAF) interface. The function of the RPM/RAF interface is to transmit data between the ring protocol management 36 and the ring attachment function 30. The function which the lines in the interface perform is self-explanatory from the names of the lines. For example, serial data which is received on serial ring IN line 32 is transmitted as serial receive data on conductor 38 to the ring protocol management means 36. Likewise, clock 40 is the timing signal (derived from serial ring data) and is used to synchronize serial data transfer at the RPM-RAF and serial ring-out interfaces. Likewise, serial transmit (XMIT) data line 42 transmits data signal which is to be synchronized and placed on the transmission ring.

Still referring to FIG. 6, ring protocol management means 36 is a grouping of digital circuitry that performs bit and byte level functions. These functions include encoding and decoding data, handling token protocols, generating and detecting delimiters, generating and checking cyclic redundancy check (CRC) decoding addresses, etc. When the ring protocol management means 36 is not in a transmit sequence, it repeats serial receive data as serial transmit data. When given a formatted message frame, in the random access memory 44 and a command to transmit ring protocol management means 36, the serial ring data is monitored for the proper token sequence indicating permission to transmit. The token sequence which is used to control the ring communication system is fully described in the above referred-to application and can be referred to for a detailed description and operation.

Once a free token for transmission is given, the ring protocol management means 36 inserts the frame in the serial ring-out data stream. The ring protocol management means 36 also strips the frame from the ring and replaces the token. The ring protocol management means 36 recognizes message frames which are addressed to this station. These message frames include the ring poll message frame which forms the basis of the present invention. The ring poll message frame includes the broadcast code which forces all adapters on the above-described ring to receive the message. In other words, recognizing and copying the ring poll message into RAM 44 is performed by ring protocol management means 36. Once the message is copied in RAM, the ring protocol management means 36 notifies the RAM over status line 46 that a message is received. The details of the ring poll messages which form the basis of this invention will be described hereinafter.

When a message frame is addressed to a particular station, the ring protocol management means 36 sets the address recognized indicator (ARI) bit. The ARI bit forms part of the ring poll message and will be described hereinafter.

Still referring to FIG. 6, the ring protocol management means 36 is coupled over RPM/RAM interface 48 and CP/RPM interface 50 to RAM 44 and control processor 52, respectively. Conductors 54 and 56 convey data to and from RAM 44 into the ring protocol management means 36. Control information such as read/write signals, address and timing signals are carried on control and address (Control & ADDR) line 58 to RAM 44. In the CP/RPM interface 50 clocking information is transmitted on clock line 60 while status information and control information are conducted on conductors 46 and 62 respectively.

As was stated previously, the ring protocol management means 36 is coupled over the CP/RPM interface 50 to control processor 52. The control processor 52 is a conventional microprocessor whose function is programmed and stored in ROM 64. Communication between ROM 64 and the control processor is effectuated over conductors 66 and 68 respectively. For example, data from the ROM is transmitted over conductor 66 while control and address information is transmitted over conductor 68 to the ROM.

The control processor (CP)/random access memory (RAM) interface interconnects the control processor to RAM 44. This interface includes data lines 70 and 72 and control and address line 74. The RAM functions as a temporary storage and is shared by the control processor and the ring protocol management means. Because microprocessors, RAM, ROM, registers and timers are well known in the prior art, a detailed description of these devices will not be given. Suffice it to say that in the preferred embodiment of this invention the control processor is a Motorola 68000.

This is an interrupt driven microprocessor. It is purchased off the shelf and is supplied with a standard set of instructions which can be used in accordance with the program flow chart (to be given hereinafter) to perform the functions necessary to effectuate the invention.

The control processor 52 interprets and understands the status of message (msg) received (Rcvd). It reads messages from the RAM and processes them in accordance with the stored control programs. The control processor further constructs message frames, saves them in the RAM and causes the RPM (FIG. 6) to transmit them on the ring by issuing the "Transmit" control command at the CP/RPM interface. Among the constructed messages are those which form part of the invention and are described in detail hereinafter.

Finally, the control processor performs certain timing functions relative to events it detects. One of the timing functions is to generate a pulse or signal at timed intervals. The signal is used to initiate the "Ring Poll Process." The signal may be generated from a "hardware timer" under the control of the microprocessor or a "software" timer called the poll timer. The other timing function is to set a bit called a "Flag" in a program register at the completion of each "Ring Poll Process." The flag is reset at the beginning of the process.

Referring now to FIGS. 2 through 5, the structure of the ring poll frame is given. That frame forms the basis of this invention and allows each station to identify itself to its next active downstream node. Information is also provided to one or more management functions. The management function or functions use the information to determine the serial order of active nodes in the ring. The "Poll Process" ensures that each station on the ring is given the address of its nearest active upstream neighbor (NAUN). The process also allows a management function which may reside in one of the stations described in FIG. 1 to obtain information which can be ordered to determine the sequence of active stations on a ring. As stated before, this information is necessary and is used in error recovery procedures.

The basic poll process involves the exchange of two messages between stations on the serial ring. These two messages are:

Poll Request: This message is sent by a station on the ring designated as the ring poll initiator.

Ring Poll Response: This message is sent by each participating ring station other than the initiator.

If ordering of the stations is needed, two other frames are involved. The frames are:

Request Ring Order: This message is sent to the ring poll initiator station by a ring management station or stations that need to know the ordering of the ring station on a particular ring.

Report NAUN: This message is sent to a ring management station or stations whenever a ring station detects that its upstream neighbor has changed or when the RRO parameter is present in the roll message.

If a poll failure occurs, it is reported and isolated by the following message:

Ring Poll Failure: This message is sent to a ring management station or stations by a ring poll initiator station when it detects that a ring poll cycle has failed.

Figures 2, 3, 4, 5:
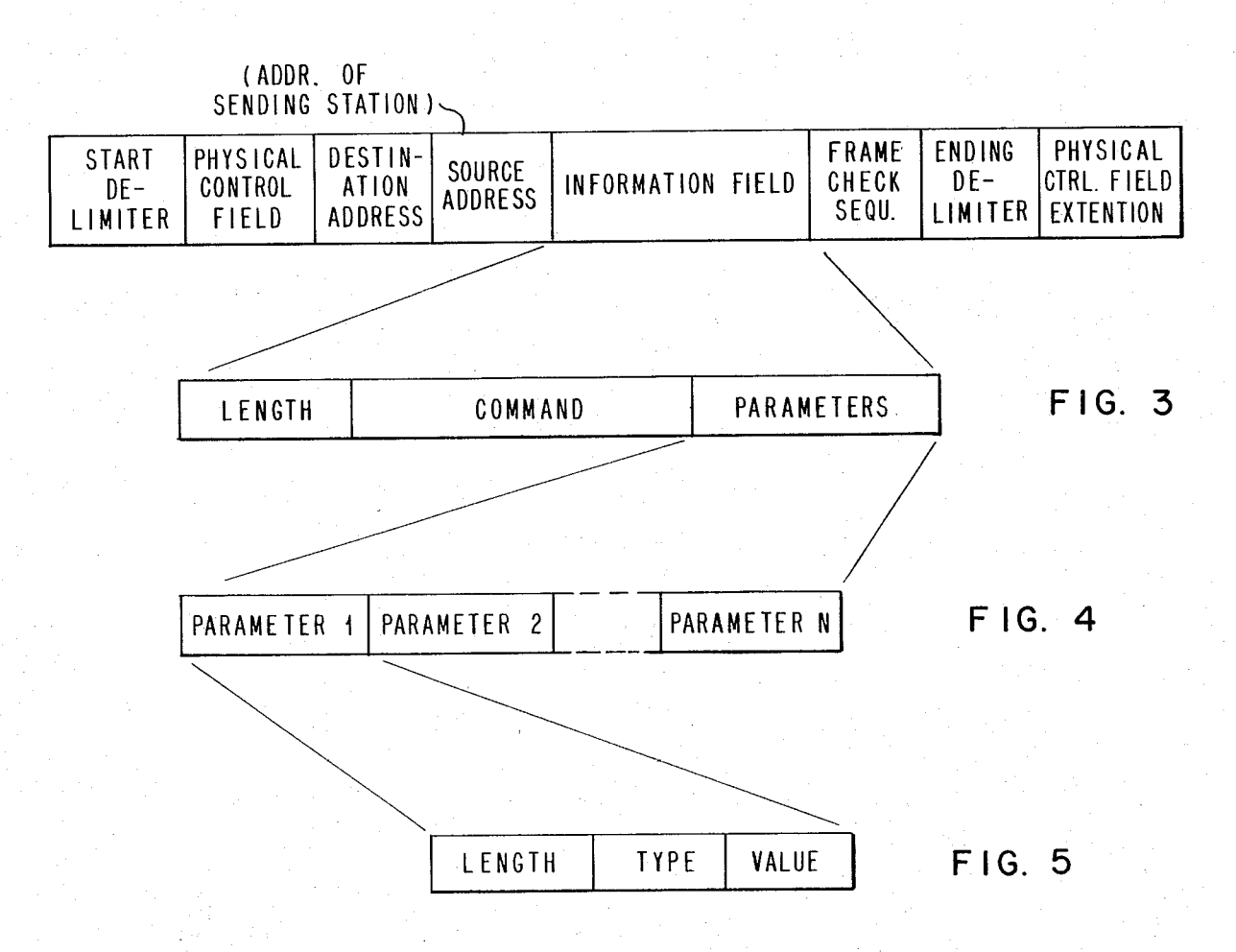

FIG. 2 shows the basic frame structure for the ring poll process. The frame includes a start delimiter (SDEL) and a physical controlled field (PCF). The start delimiter and the physical controlled field mark the beginning of the frame.

The destination address (DA) field contains the address of the station to which the frame is being sent. For ring poll messages the DA field is for "all stations." Stated another way, the message is broadcast to all active stations on the communication ring. When a station on the ring is reported as NAUN to any management function, the DA field is filled with the address of the designated ring management function.

The Source Address (SA) field contains the address of the sending station.

The information field contains the length of the frame, command field and parameters. The breakdown for the information field is shown in FIG. 3. The parameters are further broken down into Parameter 1, Parameter 2, ... Parameter N (FIG. 4). Likewise, each parameter field is broken down into a length field, a type field and a value, FIG. 5. Depending on the message which is generated, the information field is changed to reflect one of the above five messages. The details of the contents of the information field which reflect one or more of the above type of message will be described hereinafter.

The frame check sequence (FCS) section performs a redundance check covering frames, address and information field.

The ending delimiter (EDEL) section marks the frames ending sequence.

Finally, the physical control field extension (PCFE) contains the address recognized indicator (ARI) bit. This bit is used to determine whether or not a station sending a broadcast message is immediately upstream from the receiving station. To this end, when a station broadcasts the Poll Request or Poll Response message, the ARI bit is reset to a first state, say, a logical zero off. A station on receiving the message examines the bit. If it is in the off state, this informs the station that the address of the message has not been recognized by any other station and is thus from a station immediately upstream. A station on recognizing the broadcast address sets the bit in the frame as it passes (is repeated) on the ring. A downstream station receiving that message with a set bit knows that the address in the SA field is not that of an immediate active upstream neighbor and therefore discards the copied frame.

As stated above, the command in the information field can be changed to reflect whether the message is a ring poll request, a ring poll response, or a report NAUN. When the command is a ring poll request or ring poll response, the information field is configured as the below listed Table I. Table I is self-explanatory and will not be described in detail. Suffice it to say that the "Ring Station Location" identifier is the physical location of the transmitting station. Likewise, "DA for response to Order Poll" is the address of the station requiring order poll information.

TABLE I

| I-FIELD | | |
|---|---|---|
| LENGTH | x'0011' | 17 (bytes) |
| COMMAND | x'06' | Cmd - Ring Poll Request |
| | OR | |
| | x'24' | Cmd - Ring Poll Response |
| PARM-1: | | |
| LENGTH | x'06' | 06 (bytes) |
| TYPE | x'03' | Ring Station Location Identifier |
| VALUE | | (4 bytes) |
| PARM-2: | (optional) | |
| LENGTH | x'08' | 08 (bytes) |
| TYPE | x'0C' | DA for response to Order Poll |
| VALUE | | (6 bytes) |

When the command is a report NAUN command, the information field is configured as Table II. Table II is self-explanatory and no description will be given.

TABLE II

| I-FIELD | | |
|---|---|---|
| LENGTH | x'0015' | 21 (bytes) |
| COMMAND | x'07' | Cmd - Report NAUN |
| PARM-1: | | |
| LENGTH | x'06' | Length-06 (bytes) |
| TYPE | x'03' | Station's Location Identifier |
| VALUE | | (4 bytes) |
| PARM-2: | | |
| LENGTH | x'0C' | Length-12 (bytes) |
| TYPE | x'28' | Sending station's NAUN's Address and Location Identifier |
| VALUE | | (6 bytes Address, 4 bytes Identifier) |

Figure 8:
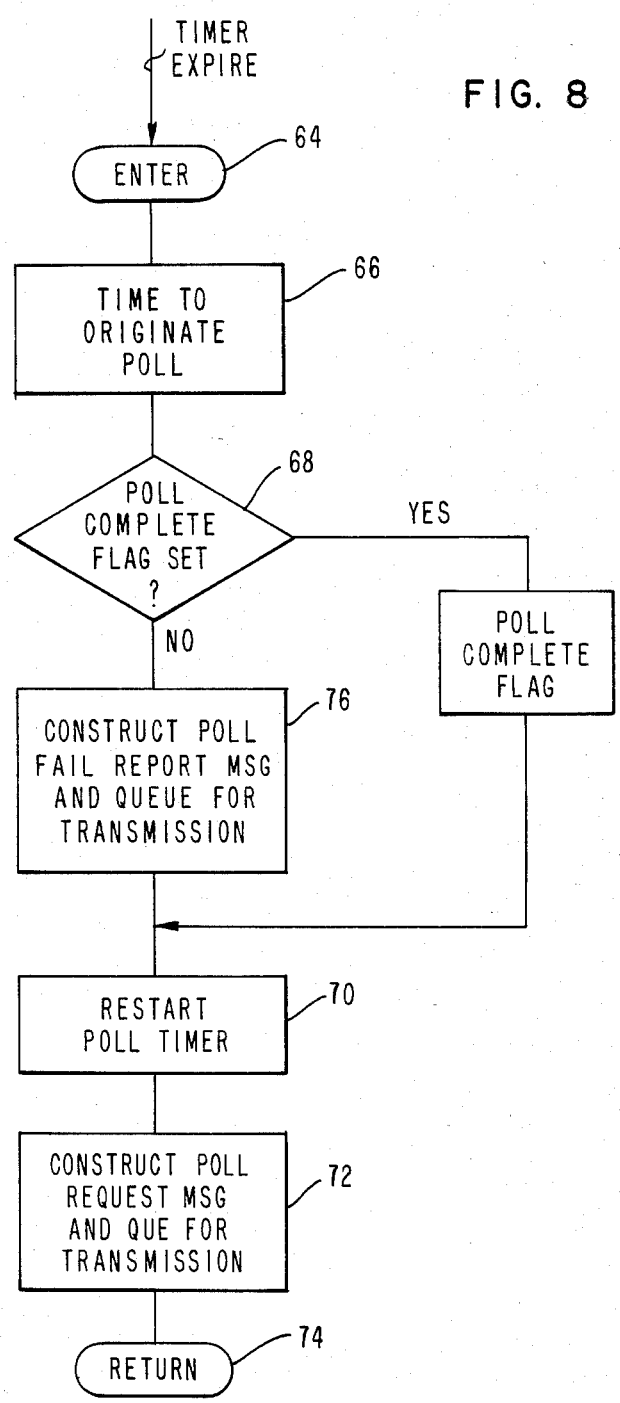
FIG. 8 shows a flow chart of a program which controls the microprocessor of an initiating station to generate a Ring Poll Request message.

FIG. 8 shows a flow chart of a program module which controls the above described microprocessor to initiate the ring "poll request" function. As stated above, the microprocessor is an interrupt driven microprocessor and as such whenever it is interrupted it branches from its normal routine to perform the process steps outlined in FIG. 8. Essentially the process steps in FIG. 8 forces the microprocessor at the station which will generate the ring "poll request" function hereinafter called the ring poll originator to prepare and transmit the ring poll frame.

The first block in the program is block 64. This is merely an enter block and illustrates the fact that the program is entering the module. The microprocessor enters this module when the above described poll timer expires. As described above, this timer may be hardware or software. The program then enters functional block 66. The block informs the processor that it is time to originate the poll function. The program then descends into functional block 68. In block 68 the program tests to see whether the poll complete flag is set. As stated above, this flag is set on the completion of every poll cycle. This flag is a bit in a program register. If the flag is set, the program then descends to functional block 70. In block 70 the program forces the microcomputer to restart the poll timer.

With the poll timer restarted the program then proceeds to functional block 72. In block 72 the program constructs the ring poll request and queues it for transmission on the transmission ring. The program then returns via block 74 to perform its original task.

Still referring to FIG. 8, if the flag at block 68 was not set, then the program descends to block 76. At block 76 the program constructs a poll fail report message and queues the message for transmission. Usually the message is transmitted to a management function station for subsequent use. From block 76 the program performs the previously described functions in blocks 72 and 74, respectively.

Figure 9:
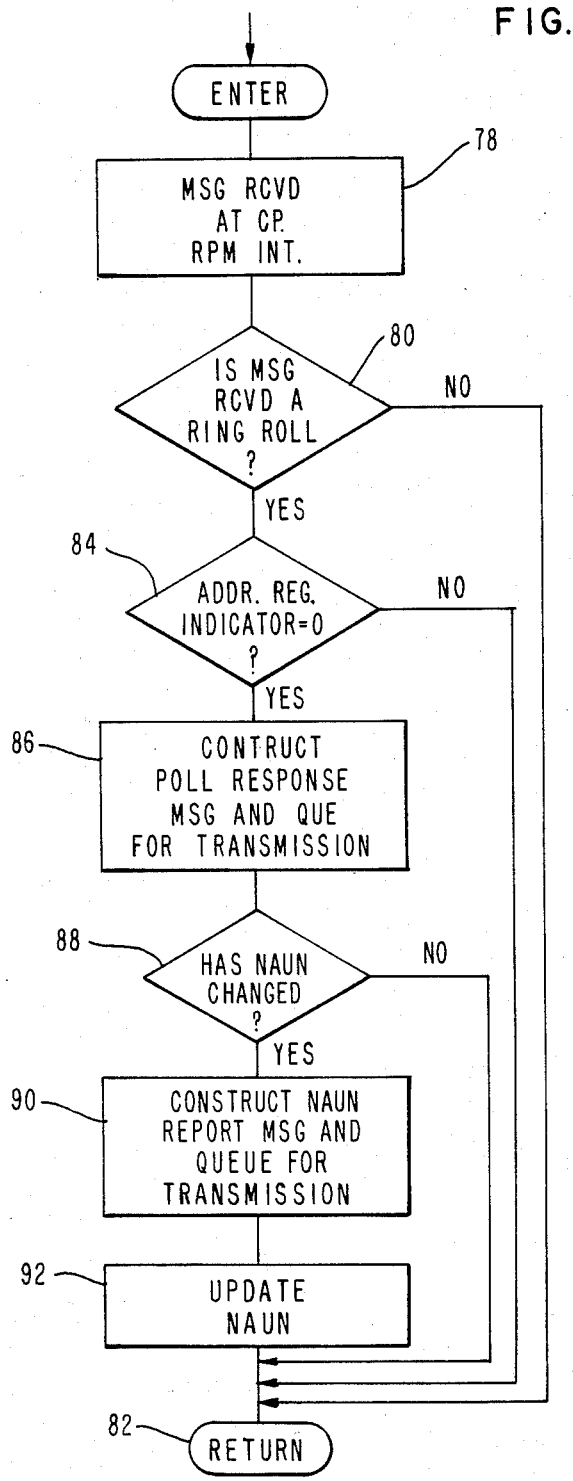
FIG. 9 shows a flow chart for a program which controls the microprocessor of a station downstream from the initiating station to generate a "Ring Poll Response" message.

FIG. 9 shows the flow chart which controls the microprocessor when a poll message is received and the station is not the initiator of a ring poll request. As stated above, the ring poll response message is generated by a non-poll originator. The first block in the message is an enter block. As before, this block merely signifies that the program is entering the module. The program then descends to functional block 78. The function is that the message is received at the CP/PRM interface. The program then descends to decisional block 80. By testing the command field in the message the program determines whether or not it is a ring poll message. If it is not a ring poll message, the program then exits this module via return block 82. If the message is a ring poll response or ring poll request message, the program then descends to decisional block 84.

In block 84 the program checks to see whether the address register indicator (ARI) bit equals zero. If the bit is not zero, this informs the microprocessor that the station identified in the SA field of the message does not represent its immediate upstream neighbor and therefore the program returns to its original task via return block 82. If the ARI bit is set to zero, the program then descends to block 86. In block 86 the microprocessor constructs a poll message and queues the message for transmission. The program then descends to decisional block 88. The program then checks to see whether the NAUN is changed. This is done by comparing the identity of the present NAUN in the message with the previously stored NAUN. If it is not changed, the program exits the module via block 82. If the NAUN has changed, the program then descends to functional block 90. In block 90 the program constructs an NAUN report message and queues for transmission. The program then descends to functional block 92. In block 92 the program updates its stored NAUN and exits the program via block 82.

Figure 7:
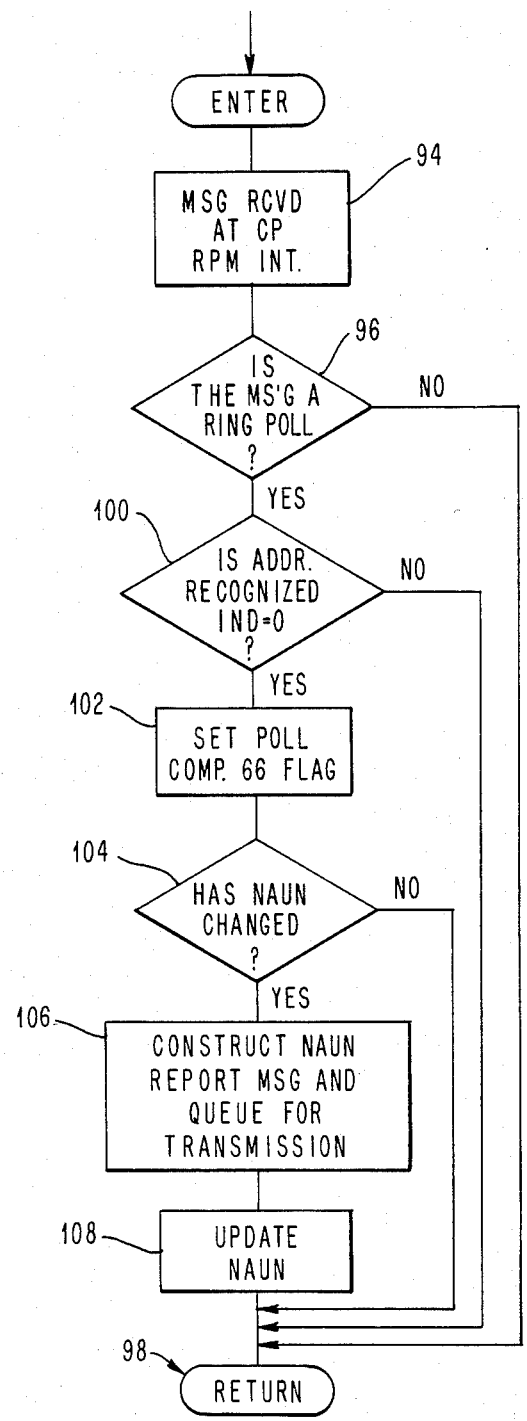
FIG. 7 shows a flow chart of a program which controls the microprocessor of an initiating station to process a Ring Poll Response Message.

FIG. 7 shows a program flow chart for the microprocessor in the station which initiated the ring poll request message when it receives a "poll response" message. This is the message which gives the address and identity of the active ring station which is upstream from the poll originating station. As before, the first block in the program is the enter block. The program then drops to block 94. The function in block 94 is that a message is received at the CP/RPM interface. With the message at the interface, the program descends to decisional block 96. In block 96 the program checks to see whether the message is a ring poll message. This check is achieved by the program examining certain fields within the message. If it is not a ring poll message, the program exits the module via return block 98. If the message is a ring poll message, the program then descends to block 100. In block 100 the program checks to see whether the ARI bit equals zero. As before, if the bit is not zero, the program exits via block 98.

If the bit is zero, the program descends to function block 102. The program then sets a poll complete flag. The poll complete flag is represented by a bit in a program register. This flag is set whenever a ring poll function is successfully completed. The program then descends to decisional block 104. In block 104 the program checks to see whether the NAUN has changed. This checking is done by comparing the NAUN identity in the presently received message with the previously stored NAUN. If the NAUN has not changed, the program exists via block 98. If the NAUN has changed, the program descends to function block 106. In function block 106 the program constructs an NAUN report message and queues for transmission. The program then descends to function block 108 where it updates its NAUN address file and exits the module via return block 98.

Figure 10:
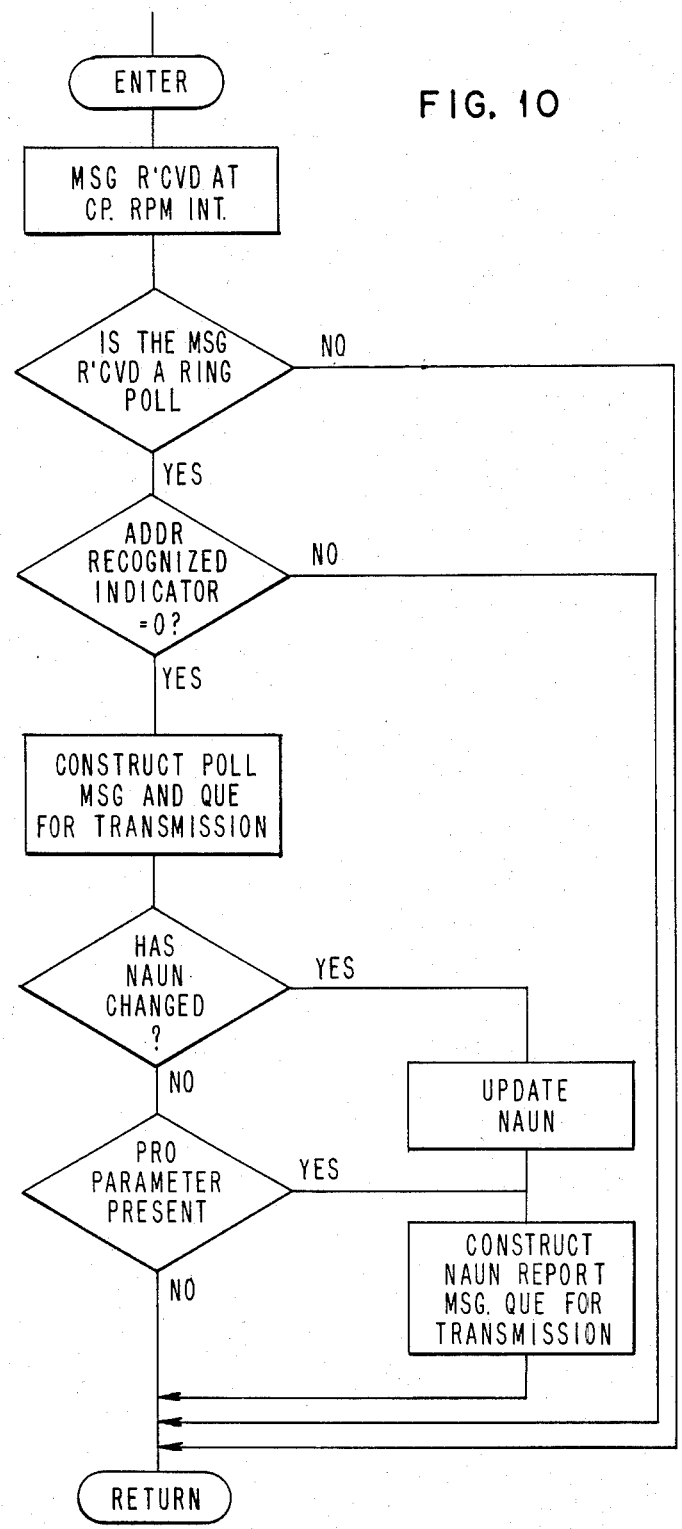
FIG. 10 shows a flow chart of a program which controls a non-originating microprocessor so that a NAUN report message is sent to a station requesting Ring Order (RRO).

FIG. 10 shows a modified flow chart of a program which controls the microcomputer when the Request Ring Order (RRO) message is issued to the poll originator from a management function station. The flow chart is self-explanatory and similar to the flow chart of FIG. 9. Therefore, only the new function in the flow chart of FIG. 10 is described. The RRO parameter is the address of the station requesting ring order information. RRO parameter is included in the ring poll request by the initiating station if it has received a request ring order message from a ring management function since the last initiation of ring poll. RRO parameter is propagated in all ring poll responses whenever the ring poll request contains the parameter. If the address is present, each station sends it a NAUN Report Message (Msg) as part of its response during the ring poll.

Figure 11:
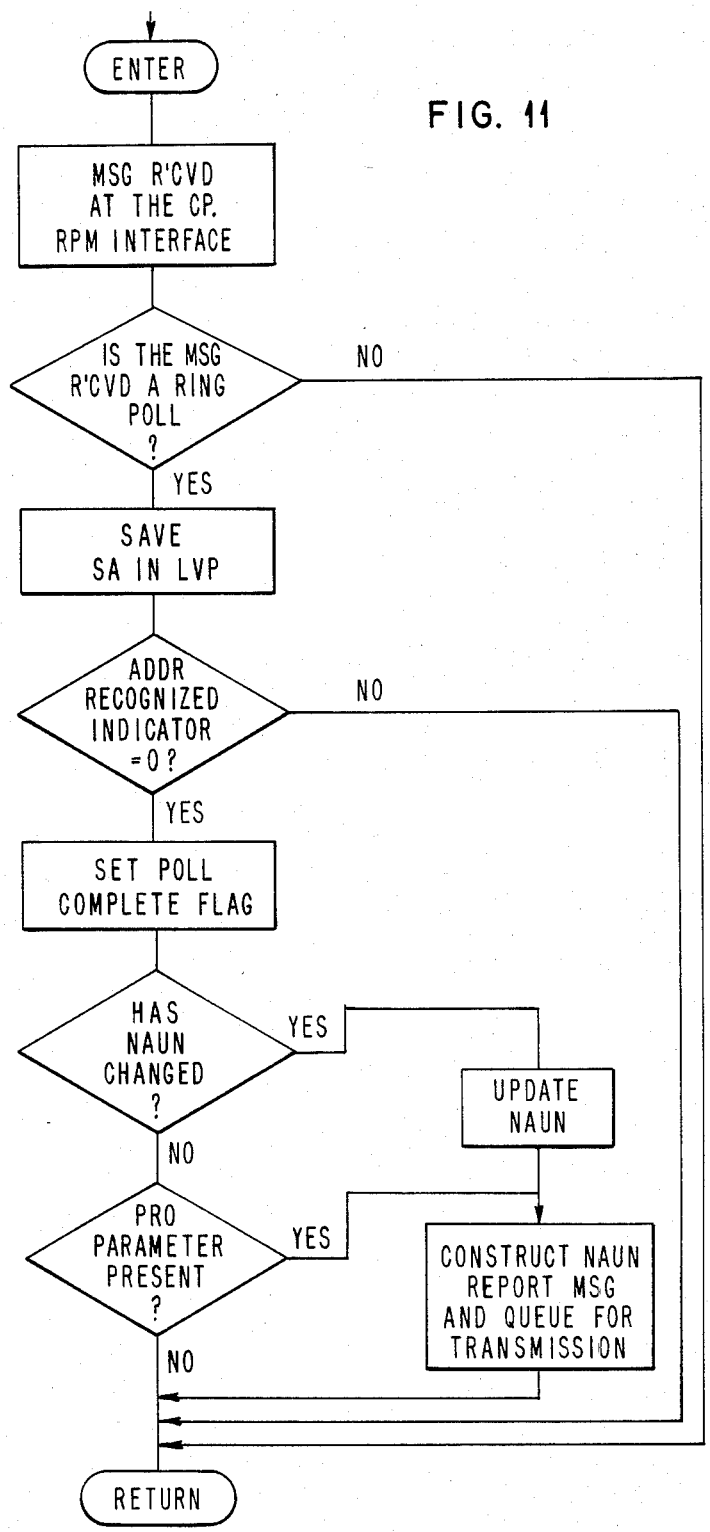
FIG. 11 shows a flow chart for a program which drives the originating microprocessor so that a poll failure is detected and isolated.

FIG. 11 shows a modified flow chart of a program which controls the microprocessor at the poll originating station which has been modified to include poll failure isolation and RRO function. FIG. 11 flow chart is self-explanatory and substantially similar to FIG. 7. Therefore, only the new functions and/or test will be described. The "Save SA in LVP" informs the microprocessor to save the address of the station sending the last valid poll (LVP) response. As will be explained subsequently, the address is saved notwithstanding the state of the ARI bit. If a failure occurs, the address identifies the last sender of a ring poll response message and is used to isolate the error zone.

Operation

In operation, one of the stations in FIG. 1 is designated as a poll originator. This station periodically broadcasts a ring poll request message having the format shown in FIGS. 2-5 and containing its node identifier to all the nodes on the ring. The message has two purposes: (a) to pass to the node immediately downstream this node identifier and (b) to notify all nodes that the poll origination function is operative. The station uses a source address portion of the frame to record its ring station's specific address and a physical identity for the station is in the information portion. Assume that the poll originator in FIG. 1 is station 1.

Station 2 on receiving the message examines the ARI bit in the physical control field portion of the message. If the bit is equal to zero, this indicates to station 2 that station 1 is the nearest active upstream node. Station 2 now knows the identity of station 1 and records it. All stations downstream of station 2 will recognize that this message does not contain their NAUN's identity because the ARI bit is not zero, having been set by station 1.

Station 2 now broadcasts a ring poll response message to all nodes. The message contains the physical address and identity of station 2. The next active downstream station from station 2 processes the message in a manner similar to that performed by station 2 with the message from station 1 and propagates the poll around the ring.

Additionally, station 2 compares its former NAUN address with its present NAUN address. If they are different, it sends a report NAUN message to a station designated to provide a ring management function containing its address and the new NAUN address. The process continues, that is, each node which receives a poll message with a zero ARI indicator saves its NAUN address and propagates the poll by sending a poll response message with its own addresses and, if its NAUN has changed, sends a report NAUN message until the poll is propagated around the ring to poll originator station 1.

When station 1 receives a ring poll response message with the ARI bit equal to zero, it knows that the poll cycle has completed successfully. The poll originator does not propagate the poll; instead, it compares and updates its NAUN. If the NAUN has changed, it reports the change to a designated management function station as described above.

Occasionally a poll may fail and this invention detects such a failure. Failure may occur because of errors introduced into the ring data which cause the poll cycle to be interrupted. This may occur whenever a ring error causes a poll message not to be received by any station due to a defect in the frame or the ARI bit to be set to logical 1 before the message is received by any station. The poll originator identifies a segment of the ring path in which error occurs as follows:

When the poll originator begins a poll, it initializes a variable register called Last Valid Poll (LVP) with its node identifier and resets the poll complete flag. After transmitting the poll request message, the node identifier in each poll response message which is received replaces the current value of the variable (LVP) register. This is done irrespective of the setting of the ARI bit. If the poll originator detects that a poll cycle is not completed successfully, (that is, it did not receive a poll response message with the ARI bit equal to zero before the next scheduled poll request transmission as indicated by the poll complete flag not being set), the value of LVP will be the identity of the node immediately upstream of ring segment or node in which the error occurred.

Whereas the ring poll process passes the identity of station to its next adjacent downstream neighbor, the order poll process allows the ordering of stations on a ring by passing the ID of all stations to a single station requesting this information and may run concurrently with the ring poll process. The order poll process is initiated by the poll originator station in its next ring poll if it has received a request ring order (RRO) message since the last poll was begun. The RRO message tells the poll originator the ring routing address of the function requesting the ring order. This address is included as a parameter in the information field of the next ring poll request sent by poll originator station 1 and is forwarded in subsequent poll responses sent by other nodes.

As the poll is propagated around the ring, the presence of this RRO parameter causes each node to send a Report NAUN message to the RRO address in addition to broadcasting the poll response message to propagate the poll.

The function whose address is the RRO parameter typically will receive a series of Report NAUN messages, one from each node in the ring as the poll propagates around the ring. The order of transmission of the report is not critical to understanding the ring node order since each message contains both the sender's identity and its NAUN address. This completes the detailed description of the invention.

The following advantages are provided by the above described invention. The invention minimizes the throughput requirement needed for a ring station to identify itself to other stations on a ring. The protocol for normal traffic on the ring is not interrupted. No resources are needed at the originating station to maintain the polling operation once it has started. The polling operation is self-ending and has a positive indication of successful completion.

While the invention has been particularly shown and described with reference to a preferred embodiment thereof, it will be understood by those skilled in the art that various changes in form and details may be made therein without departing from the spirit and scope of the invention.

Having thus described our invention, what we claim as new, and desire to secure by Letters Patent is:

1. A method for determining the identity of a next active upstream station (NAUN) in a reconfigurable serial ring network system having a plurality of ports for accepting and supplying messages to a plurality of mobile stations adapted for connection to any of said ports comprising the steps of:
    (a) periodically transmitting to all stations (broadcasts) from one of said ports a message having a first unique command, the identity of the source of the message, and an indicia having at least two states;
    (b) at each active station, recognizing the unique command and examining the state of the indicia;
    (c) at each active station, storing the identify of the source only if the indicia is in a first state;
    (d) at each active station, changing the indicia to a second state for messages whose source identity is being copied;
    (e) transmitting a second message which is substantially the same as said first message, including the identity of the transmitting station, a second unique command and an indicia in said first state;
    (f) at each active station, recognizing the second unique command and examining the state of the indicia; and
    (g) successively repeating at the serially connected active ring stations steps (c) through (f) until an initiating station receives the second message with the indicia in said first state thereby indicating that all active stations on the ring network system have received the identity of the next active upstream station.

2. The method recited in claim 1 further including the steps of:
    including in the message of step (a) a control field indicating the identity for a management function station requiring information concerning the order of the stations on said ring; and
    transmitting a third message from the transmitting station of step (e) to the management function station.

3. The method recited in claim 2 further including the steps of transmitting the third message from the initiating station of step (g) to the management function station.

4. The method recited in claim 1 further including the steps of initializing a variable (LVP) register in a station that generates the message in step (a); and
    sequentially updating the variable LVP register with the current station identifiers contained in the messages transmitted from step (e) so that for an incomplete ring poll cycle the current value of the LVP register represents the identity of the station immediately upstream of a ring segment or station in which an error occurs.

5. The method recited in claim 4 further includes the steps of reporting the value of the variable LVP register to a management function station.

6. A method for operating a serial data transmission ring which includes a plurality of stations (nodes) adapted to be inserted and removed from the ring's serial data path during normal ring operation with said station being connected in series with each other to form an endless series circuit ring in which data messages emanating from one station traverse the ring and are received in sequence by all stations on the ring including an originating station after the data message has passed through all of the other stations, said method comprising:
    (a) generating a message frame at one of said stations, said message frame having a source address section with indicia representative of a sending station, an information field containing a unique command and a physical control field section containing a control bit being in a first state at the time of generation;

(b) at a next active downstream station setting the control bit to a second state, recognizing the command, examining the control bit and if said bit is in the first state, copying of the source address, classifying the source address as the NAUN, and issuing a second message frame with the source address section containing the address of the sending unit, a second unique command in the information field and the control bit in the first state;

(c) receiving the second message frame at another active station downstream from the next active station and processing the message in accordance with step (b);

(d) for each subsequent downstream station, repeating the steps (b) through (c) until the station in step (a) receives a second message frame with the control bit in the first state.

7. The method set forth in claim 6 in which the message frame of step (a) further includes a parameter section with indicia identifying a station to which order poll responses should be sent.

8. The method set forth in claim 7 wherein the second message frame includes a parameter section with indicia indicating the sending station NAUN's address.

9. The method set forth in claim 7 further including the steps of sending a Request Ring Order message to the station of step (a) said message informing the station of a routing address for a station requesting the order of stations on the ring.

10. In a serial ring communication network wherein stations are randomly inserted and removed from the ring an apparatus for polling the stations to determine the identity and location of inserted stations on the ring comprising:

a poll initiating means operable to periodically output an enabling signal;

a first control means, including a microcomputer, responsive to the enabling signal and operable to generate a message frame having the address of a station generating the message frame, a unique command and a control indicia;

a second control means disposed on the ring at a zone downstream from the first control means; said second control means being operable to examine the control indicia and if said indicia is in one state to generate a second message having the identity of a station generating the second message, a unique command and the control indicia;

a register means coupled to the first control means; and monitoring means positioned at the first control means and operable to monitor the second messages and to set an indicator bit in said register means when the control indicia is in the first state.

11. A method for acquiring the identity of a next active upstream station (NAUN) in a reconfigurable serial ring network having a plurality of ports for accepting and supplying messages to a population of mobile terminals adapted for connection to any of said ports comprising the steps of:

transmitting selectively from one of said ports a message including a first unique command, the identity of the source of the message, and an indicia having at least two states; at each active station, recognizing the unique command examining the said indicia for determining the state of said indicia, at each active station, storing the identity of the source and identifying the said source identity as the NAUN only if the indicia is in a first state and changing the state of said indicia to the second state if it was in the first state as received; and transmitting at the next opportunity offered by the station a message including the identity of the transmitting or source station, a second unique command, and an indicia in the said first state whereby the steps recited above are repeated successively at the serially connected active ring stations until the initiating station receives the second unique command and an indicia in the said first state thus indicating that all active stations on the ring network have received the identity of the next active upstream station.

* * * * *